United States Patent [19]

Buzzelli

[11] 4,168,349
[45] Sep. 18, 1979

[54] IRON/AIR BATTERY SYSTEM HAVING CIRCULATING ELECTROLYTE AND A HORIZONTAL CELL CONFIGURATION

[75] Inventor: Edward S. Buzzelli, Franklin Township, Cambris County, Pa.

[73] Assignee: Westinghouse Electric Corp., Pittsburgh, Pa.

[21] Appl. No.: 900,684

[22] Filed: Apr. 27, 1978

[51] Int. Cl.$^2$ .............................................. H01M 8/04
[52] U.S. Cl. ...................................... 429/14; 429/38
[58] Field of Search ...................... 429/14, 13, 27, 28, 429/29, 25, 22, 38

[56] References Cited

U.S. PATENT DOCUMENTS

| | | | |
|---|---|---|---|
| 400,215 | 3/1889 | Imschenetzhy | 429/80 |
| 3,306,774 | 2/1967 | Dengler | 429/34 |
| 3,666,561 | 5/1972 | Chiku | 429/18 |
| 3,977,901 | 8/1976 | Buzzelli | 429/40 |

FOREIGN PATENT DOCUMENTS 1603213  3/1971  France ........................................ 429/14

*Primary Examiner*—Donald L. Walton
*Attorney, Agent, or Firm*—D. P. Cillo

[57] ABSTRACT

A horizontally disposed iron/air battery cell, comprising two horizontally disposed air electrodes having air and electrolyte contacting sides, and side casings for holding the air electrodes, where the air electrodes and side casings define an electrolyte compartment containing electrolyte and a horizontally disposed iron electrode, with one casing side having at least one electrolyte inlet, and the opposite casing side having at least one electrolyte outlet, is operated by supplying air to the air side of the air electrode, and circulating electrolyte through a pump and then through the electrolyte compartment of the cell, where the total cross-sectional area of the outlet is between 1.25 to 5 times greater than the total cross-sectional area of the inlet, causing the pressure on the electrolyte contacting sides of the air electrodes to be between 0.5 psi. to 6.5 psi. less than the pressure on the air sides of the air electrodes.

7 Claims, 5 Drawing Figures

IRON/AIR BATTERY SYSTEM HAVING CIRCULATING ELECTROLYTE AND A HORIZONTAL CELL CONFIGURATION

BACKGROUND OF THE INVENTION

Iron/air batteries, having flat, bifunctional air electrodes and vertical cell configurations, are well known, and are taught by Buzzelli, in U.S. Pat. No. 3,977,901. Circulation of electrolyte to cool batteries and diminish polarization is also known in the art. Imschenetzky, in U.S. Pat. No. 400,215, taught continuous, upward circulation of electrolyte, between flat, vertically disposed zinc and carbon electrode plates; and Chiku, in U.S. Pat. No. 3,666,561, taught continuous, pump forced, diagonal upward circulation of electrolyte, around flat, vertically disposed zinc/air electrodes.

Vertical, metal/air battery cell configurations, with either gravity fed or pump forced electrolyte circulation tend to have inadequate electrolyte availability, with resultant limited life, and air electrode delamination caused by the hydrostatic pressure of the electrolyte. Dengler, in U.S. Pat. No. 3,306,774, taught continuous, horizontal circulation of fuel-electrolyte, such as butene-KOH, between a flat, horizontally disposed air electrode and a flat, horizontally disposed floating anode, in a fuel cell. Such a design would not be particularly compact, and would provide problems in terms of electrical connections.

What is needed, is a method of operating a metal/air battery, having a compact, flat, stationary electrode configuration, which would provide more uniform electrolyte availability, more efficient gas removal, and ease of removal of dislodged active material particles, while providing power rates of about 25 W/lb. to 40 W/lb. without air electrode delamination.

SUMMARY OF THE INVENTION

It has been found, unexpectedly, that the above problems are solved and the above need met, by operating an iron/air battery system with a series of horizontally disposed, flat, stationary, compact cells, in cooperation with a pumping means that evacuates electrolyte from the battery, rather than pumping electrolyte in.

The cell structure comprises a stationary, flat, metal electrode positioned in an electrolyte enclosure between two stationary air electrodes, with space between the air electrodes and metal electrode for electrode separators and electrolyte circulation. The electrolyte is sucked into each cell through inlets having a smaller cross-section than the electrolyte outlets, so that the pressure inside of the cell is less than the pressure outside of the cell.

This design provides many significant advantages. First, the electrodes are under a positive pressure at all times because of the pulling of the electrolyte out of the cell. Secondly, electrolyte availability is more uniform and the quantity in the cell minimized. Thirdly, more efficient gas removal in the charge mode is accomplished by pulling the gas out of the cell with the electrolyte as the gas is formed. This is accomplished by having more volume in the electrolyte exit portholes of the cell than in the feed holes. Fourth, the horizontal design permits central symmetry with respect to the current collector configuration, and tabs can be taken from both sides of the individual electrodes without added geometrical complications. The fifth advantage is that this type of electrolyte circulation maintains a rather uniform temperature within the cell, preventing overheating at high drain rates. Another advantage is that an open cell separator can be used, because any particulate matter loose in the cell is removed by the electrolyte circulation system.

As an overall result, the cells designed and tested in the horizontal mode, with pulled electrolyte, delivered almost twice the power (25 W/lb.) as a vertical cell, and provided energy densities in excess of 58 Wh/lb., at the 10 to 15 hour drain rate. Lifetimes in the horizontal mode have exceeded 125 complete charge-discharge cycles over a four-month period, without the severe problems encountered in the vertical cell design.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
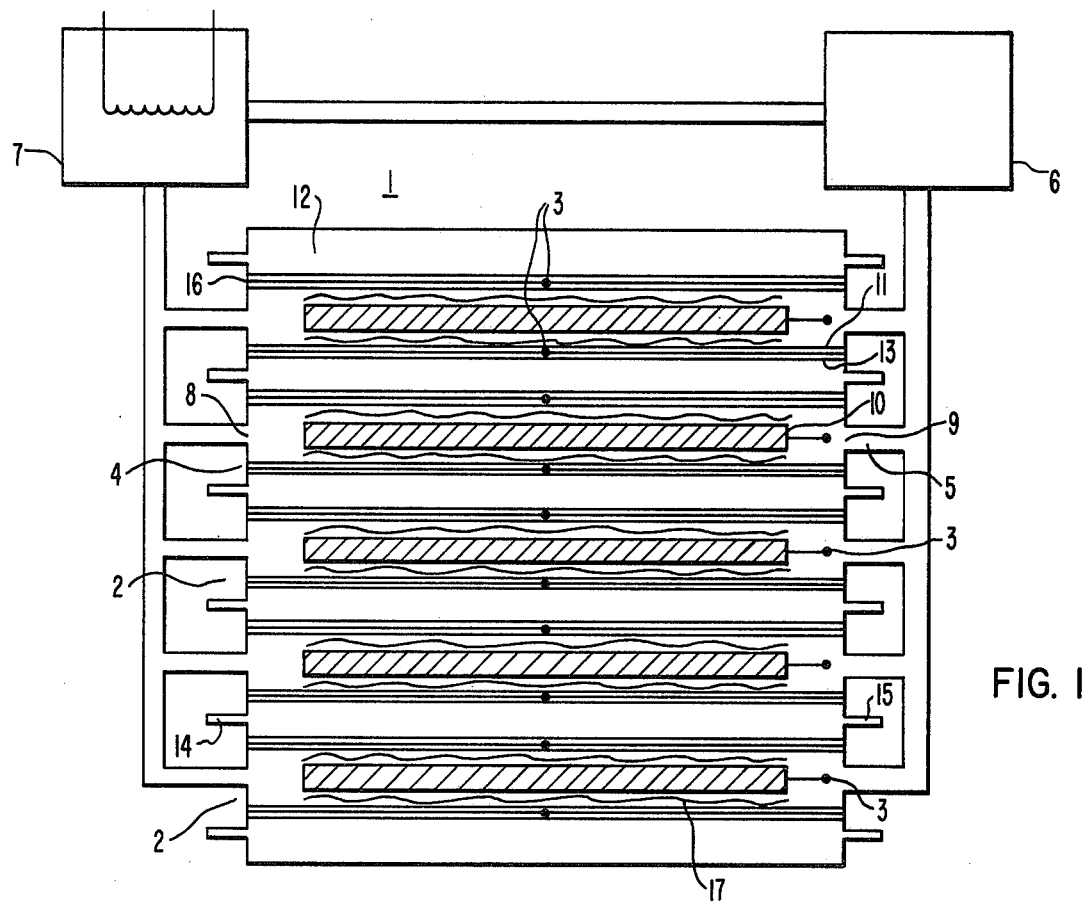
FIG. 1 is a schematic, cross-section view of an assembly of iron/air cells to form a battery module, having an associated electrolyte circulation system comprising a pump evacuation means and a heat exchanger means.

Referring now to FIG. 1, a battery 1 is shown, comprising five, series stacked, electrically interconnected, iron/air cells 2, with associated electrical interconnections 3, and electrolyte circulation system 4 and 5. Electrolyte flows into each cell through inlets 4, and exits each cell through outlets 5, wherein the electrolyte is pulled through each cell by pump evacuation means 6. Heat exchanger means 7 is also shown with associated cold water cooling coils within the cooling reservoir, which generally contains an electrolyte addition inlet and barrier venting means. A radiator or other cooling apparatus could be added to the system for air cooling, to replace or supplement the cooling coils. Electrolyte will be circulated through the cells by the evacuation pump, at rates effective to remove the heat and gas generated by the various charge-discharge cycles of the battery.

Electrolyte level and specific gravity can be controlled by adding water to the cooling reservoir. The battery system can further be vented to the atmosphere by, for example, a sintered ceramic vent. This vent is effective to allow excess hydrogen and oxygen not removed in the circulating electrolyte system to escape, while acting as a flame and explosion barrier. The alkaline electrolyte generally used, will be a 10 wt.% to 35 wt.% KOH aqueous solution, which can also contain a variety of additives to help improve cell performance. The electrolyte is circulated through each cell by any type of suitable pump; in a manner effective to evacuate electrolyte from the battery, rather than pump it through the battery. This is accomplished by providing, for each cell 2, an electrolyte outlet 5 having a total cross-sectional area at point 9 of between 1.25 to 5 times, preferably 1.25 to 4 times the total cross-sectional area of the electrolyte inlet 4 at point 8. Thus, the pump, in combination with the enlarged outlets, is effective to create a pressure on the hydrophobic (air contacting) side 13 of the air electrodes 12, that will be greater than the pressure on the electrolyte side.

The negative, iron electrodes 10, can be made by hydrogen reduction of $Fe_2O_3$ at between 500° C. and 1,000° C., to produce iron particles which can be sintered to form a selfsupporting structure, as described in U.S. Pat. No. 3,847,603, herein incorporated by reference. Iron particle sintered electrodes made by any other technique would also be useful. The negative electrode can also comprise iron particles such as iron oxide or iron oxide hydrate, with or without additives, such as sulfur, wet pasted on and into 75% to 95% porous, diffusion bonded, metal fiber plaques, as is well known in the art. An integrally molded electrically conducting current collector will be attached to the iron electrode to allow electrical interconnection.

The positive bifunctional air electrodes 12, will generally have an inner hydrophilic (electrolyte contacting) side 11, and an outer hydrophobic (air contacting) side 13. The hydrophilic side contacts electrolyte and concentrates materials effective to help prevent the electrolyte from flooding the air electrode. In many instances, in the prior art systems, pump pressure would force the electrolyte through the hydrophilic side causing delamination of the air electrode structure at the hydrophobic side. The hydrophobic side is in contact with a source of air or oxygen which is fed, by any suitable means, through inlets 14. The air exits at outlets 15. A catalyst is usually dispersed through the air electrode and concentrated near an integrally molded mesh or other type current collector 16. Optional separators 17 are shown in the space between the iron and air electrodes.

In some cases a separate hydrophobic layer can be used. This separate layer can comprise, for example, a sheet of porous polytetrafluoroethylene, alone, or in combination with polymethacrylate and plasticizers, such as dialkyl phthalate. In many instances, however, the air electrode has a structure of decreasing electrolyte permeability from the hydrophilic side to the hydrophobic side, without the use of separate layers. This may be accomplished by concentrating polytetrafluoroethylene, polymethacrylate or the like non-wetting materials on the hydrophobic side of the air electrode.

The air electrode body can comprise, for example, a mixture of an oxygen absorption/reduction carbon black, preferably acetylene black, having a particle size range of between about 0.005 to 0.13 micron, and a total probable surface area of from about 30 to 600 sq. meters/gram; an effective amount of bonding/non-wetting agent generally including polytetrafluoroethylene; an effective amount of a catalyst such as one of silver, platinum and silver-mercury alloy; and an effective amount of a low oxygen overvoltage material such as $WS_2$, WC and WC fuse sinter coated with 1 to 20 wt.% Co and their mixtures. In both the iron and air electrodes, the current collector can be made of diffusion bonded steel wool, optionally coated with nickel or cobalt, diffusion bonded nickel fibers, expanded nickel sheet and the like. Air electrode construction and materials are well known, and taught in U.S. Pat. No. 3,977,901, herein incorporated by reference.

Figure 2:
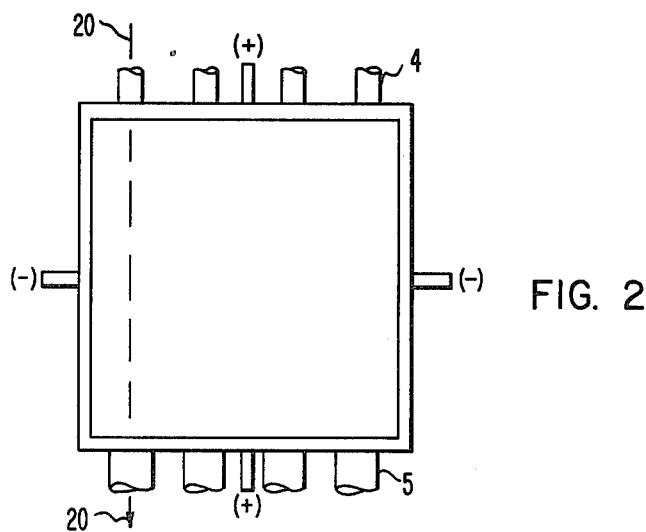
FIG. 2 is a top view of one embodiment of the iron/air cell that can be used in this invention.

FIG. 2 shows a top view of one embodiment of an iron/air cell, and shows the electrolyte inlet and outlet configuration, and the electrical interconnections. The positive air electrode and negative electrode current collector interconnection tabs are shown. They will generally be on opposite sides of each cell, disposed 90° from each other, and will extend beyond the side wall of the cell. As can be seen, the electrolyte outlets 5, are larger than the electrolyte inlets 4, having at least a 1.25 times greater total cross-section that is effective to create a positive pressure on the hydrophilic side of the air electrode when electrolyte is circulating. Although four inlet and four outlet tubes are shown, other configurations can be used, for example six inlet and four outlet tubes, as long as the total cross-section of the outlets is at least 1.25 times greater than the total cross-section of the inlets. The direction of electrolyte flow is shown by arrow 20. Both the inlets and outlets will preferably be in tubular form.

Figure 3:
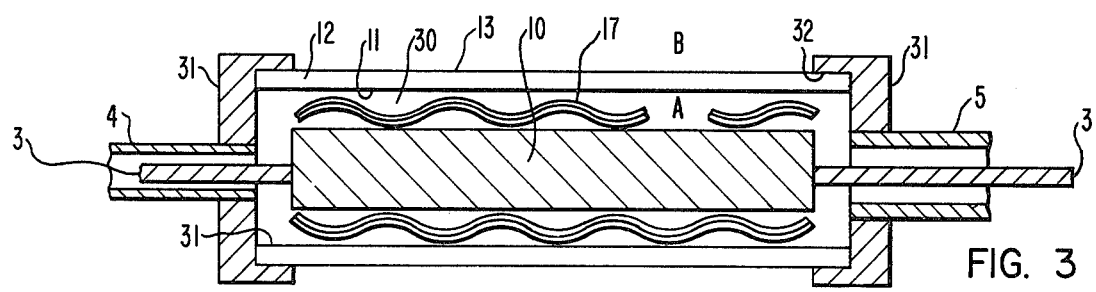
FIG. 3 is a cross-sectional view of one embodiment of the iron/air cell that can be used in this invention.

FIG. 3 shows a cross-section of the iron/air cell. The air electrodes 12 have a hydrophilic side 11 which contacts electrolyte 30 which is contained within and flows through the electrolyte compartment volume between the air electrodes in each cell. The air electrodes will generally have decreasing porosity from the hydrophilic side 11 to the hydrophobic side 13, which contacts air, in a manner effective to prevent electrolyte seeping to the air side. A negative iron electrode 10, with its associated electrical conductor interconnection tabs 3, is shown within the interior cell volume defined by the flat face of the air electrodes and the side casings supporting the air electrodes. The metal or plastic cell side casing edges 31 can hold the air electrodes in a stationary position at points 32.

Optional separators 17, are disposed between the iron and air electrodes, to prevent possible contact. The separators should be porous, not easily degradable by the electrolyte and can be either a single ply or a multiply construction. Suitable materials could include mesh or fabric in the form of polypropylene, fiberglass, styrenebutadiene-acrylonitrile copolymers, and the like.

Large diameter electrolyte outlet tubes 5 and smaller diameter electrolyte inlet tubes 4 are shown. Electrolyte is horizontally fed into the inlet of each flat cell, where it flows into the electrolyte chamber between the air electrodes and the side cell casings. The electrolyte flows around the iron electrode contained in the chamber between the air electrodes, and exits through an outlet which has a larger cross-sectional area than the inlet. As a result of the outlet being larger than the inlet, the electrolyte is pulled out of the cell.

It is essential, in the horizontal cell configuration of this invention, that the electrolyte outlet means 5 have a total cross-sectional area of between 1.25 to 5 times the total cross-sectional area of the electrolyte inlet means 4. This will cause a situation where the pressure inside the cell will be 0.5 psi. to 6.5 psi. less than the pressure outside of the cell. The pressure at A, in FIG. 3, will be less than the pressure at B. The pressure difference across the air electrode, between the hydrophilic (electrolyte contacting) side and the hydrophobic (air contacting) side will be between 0.5 psi. to 6.5 psi., is preferably between 0.5 psi. to 5.0 psi. If the battery is operated at atmospheric pressure, so that the air pressure at B is 14.7 psi., then the pressure at A can range from about 14.2 psi. to about 8.2 psi. If the pressure difference across the air electrode is greater than 6.5 psi., air can be drawn through the air electrode and into the electrolyte stream causing possible interior delamination of the air electrode and gas removal problems. If the pressure difference across the electrode is less than 0.5 psi., pressure from the electrolyte can cause seeping of electrolyte through the air electrode and delamination on the air side.

EXAMPLE 1

A bifunctional air electrode was fabricated by a wet pasting technique. Ten grams of acetylene black carbon sold by Shawinigan Products Corp., consisting of substantially discrete, connected particles, having a particle size diameter between about 0.02 to 0.10 micron, and a surface area of about 65 sq. meters/gram, was mixed with about 30 grams of WC coated with about 10 wt.% Co, about 7.5 grams of liquid polytetrafluoroethylene non-wetting binding agent, and about 3 to 7.5 grams of fibrillated polypropylene hydrophobic agent. Water was added to the mixture to provide a paste having a thick consistency. The paste was then spread into as well as over both sides of a plurality of 6.5"×6.5" diffusion bonded, 0.045" thick, 6% dense, nickel fiber plaque current collectors. The pasted plaque was then dried to remove moisture and pressed at about 18 tons in a flat-bed press, to provide air porous air electrodes about 0.040" thick.

Iron electrodes were made from $Fe_3O_4$ particles. These iron particles were pasted onto both sides of a plurality of 5.5" square, 0.075" thick, nickel fiber current collectors, to provide iron electrodes about 0.150" thick. Lead tabs were then attached to both the air and iron electrodes. Cell case sides were fabricated from styrenebutadiene-acrylonitride plastic, and several 7"×7"×½" cells, having the construction shown in FIG. 3, were made and sealed. The air window provided by the air electrode was approximately 6"×6".

In the volume between the air electrodes of each cell was disposed a central iron electrode, having a 0.02" thick open screen polypropylene separator on either side, between the iron electrode and the hydrophilic (electrolyte contacting) side of the air electrode. Six electrolyte inlet and four electrolyte outlet tubes were inserted into cut-out portions of the cell case sides and sealed. The inlet tubes had an inside diameter of 0.07 inch, providing a total inlet cross-sectional area of $2.3 \times 10^{-2} in^2$. The outlet tubes had an inside diameter of 0.12 inch, providing a total outlet cross-sectional area of $4.52 \times 10^{-2} in^2$. The ratio of total inlet:total outlet cross-sectional area was 1:1.96.

Tab configuration had positive tabs disposed 90° from the negative tabs on both sides of the electrodes. Electrical connections were made, the cell was positioned horizontally, and 25 wt.% KOH electrolyte was sucked through the cell, by a pump that evacuated rather than pushed electrolyte through the cell. The flow rate was about 100 to 150 ml./min. The pressure difference across the air electrode was from about 0.7 psi. to about 1.0 psi., i.e., there was less pressure on the electrodes inside the cell than outside the cell.

Figure 4:
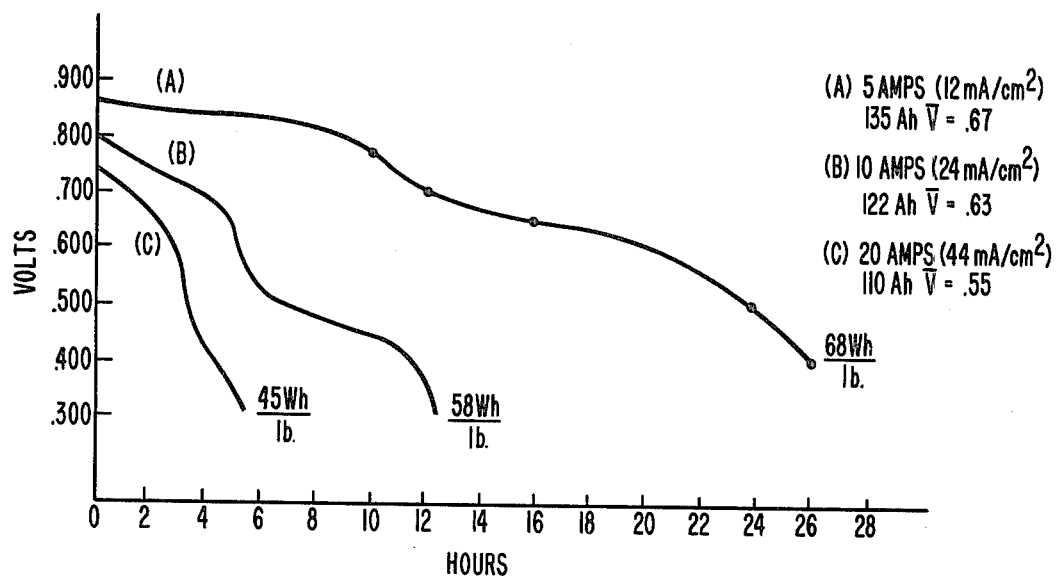
FIG. 4 shows a graph of various discharge characteristics of cells operated by the method of this invention.

The cell was operated at three different discharge rates. The energy density of the cell varied from 68 Wh/lb. at a 27 hour drain rate to 45 Wh/lb. at a 13 hour drain rate. These iron-air cell discharge characteristics are shown in FIG. 4. The performance, in terms of capacity during discharges, went from 135 Ah at a 0.67 V average, to 100 Ah at a 0.55 V average. The cell was tested for 135 cycles over a period of about 4 months.

Figure 5:
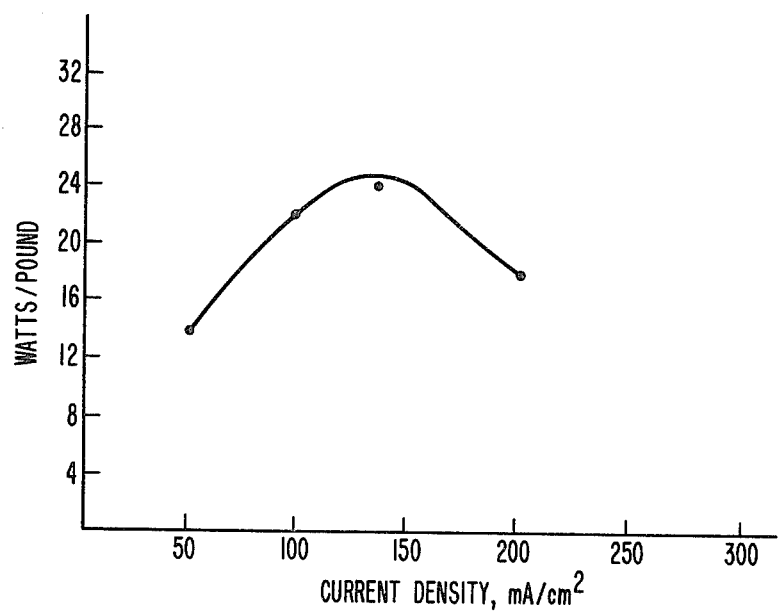
FIG. 5 shows a graph of the power characteristics of cells operated by the method of this invention.

FIG. 5 shows the power curve for this cell, which delivered about 25 W/lb. at about 140 mA/sq. cm. air electrode current density and 240 mA/sq. cm. iron electrode current density. Several of these cells were electrically connected to provide a battery module which operated in a very efficient manner.

I claim:

1. A method of horizontally operating an iron/air battery cell, said cell comprising two flat, horizontally disposed air electrodes having electrical interconnections thereon, each having an air contacting side and an electrolyte contacting side, means to supply air to the air sides of the air electrodes, side casings for holding the air electrodes in a stationary position, the air electrodes and side casings defining an electrolyte compartment containing electrolyte contacting the electrolyte sides of the air electrodes, and a flat iron electrode, having electrical interconnections thereon, horizontally disposed between the electrolyte contacting sides of the air electrode, one casing side having at least one electrolyte inlet into the electrolyte compartment and the opposite casing side having at least one electrolyte outlet; wherein electrolyte is circulated through a pumping means, and then horizontally through the electrolyte compartment of the cell, where the total cross-sectional area of the electrolyte outlet is between 1.25 to 5 times greater than the total cross-sectional area of the electrolyte inlet, causing the pressure on the electrolyte contacting sides of the air electrodes to be between 0.5 psi. to 6.5 psi. less than the pressure on the air sides of the air electrodes.

2. The method of claim 1, wherein the electrolyte is also circulated through a heat exchanger means, the air electrodes comprise carbon, catalyst, binding agent and an electrical current collector, and the iron electrode comprises iron particles and an electrical current collector.

3. The method of claim 1, wherein a porous separator is positioned between the air electrodes and the iron electrode of the cell.

4. The method of claim 1, wherein the electrolyte comprises 10 wt.% to 35 wt.% KOH, and the iron used on the iron electrode is made by hydrogen reduction of $Fe_2O_3$.

5. The method of claim 2, wherein the carbon is an oxygen absorption/reduction carbon black, the binding agent comprises polytetrafluoroethylene, the catalyst is selected from the group consisting of silver, platinum, silver mercury alloy and mixtures thereof, and where the air electrode is bifunctional and also contains a low oxygen overvoltage material selected from the group consisting of $WS_2$, WC, WC fuse sinter coated with 1 to 20 wt.% Co and mixtures thereof.

6. The method of claim 2, wherein the electrical interconnections of the air electrodes are disposed 90° from the electrical interconnections of the iron electrodes, the inlets and outlets are tubular in form and the cell provides an energy density in excess of 58 Wh/lb. at a 10 to 15 hour drain rate.

7. The method of claim 2, wherein the total cross-sectional area of the electrolyte outlet is between 1.25 to 4 times greater than the total cross-sectional area of the electrolyte inlet, causing the pressure on the electrolyte contacting sides of the air electrodes to be between 0.5 psi. to 5.0 psi. less than the pressure on the air side of the air electrodes.

* * * * *